No. 828,958. PATENTED AUG. 21, 1906.
A. W. NELSON.
ROTARY CUTTER FOR WOODWORKING MACHINES.
APPLICATION FILED OCT. 26, 1905.

Witnesses
Edward R. Moust.
Georgiana Chace

Inventor
Arthur W. Nelson
By Luther V. Moulton
Attorney

UNITED STATES PATENT OFFICE.

ARTHUR W. NELSON, OF CHICAGO, ILLINOIS.

ROTARY CUTTER FOR WOODWORKING-MACHINES.

No. 828,958.

Specification of Letters Patent.

Patented Aug. 21, 1906.

Application filed October 26, 1905. Serial No. 284,516.

*To all whom it may concern:*

Be it known that I, ARTHUR W. NELSON, a citizen of the United States, residing at Chicago, in the county of Cook and State of Illinois, have invented certain new and useful Improvements in Rotary Cutters for Woodworking-Machines; and I do hereby declare the following to be a full, clear, and exact description of the invention, such as will enable others skilled in the art to which it appertains to make and use the same.

My invention relates to improvements in rotary cutters for woodworking-machines; and its object is to provide a substantially smooth cylindrical structure without projecting bolt-heads to reduce expense in making cutters, to provide a device that will securely hold a cutter having no perforations, and to provide the device with various new and useful features hereinafter more fully described, and particularly pointed out in the claims, reference being had to the accompanying drawings, in which—

Figure 1:
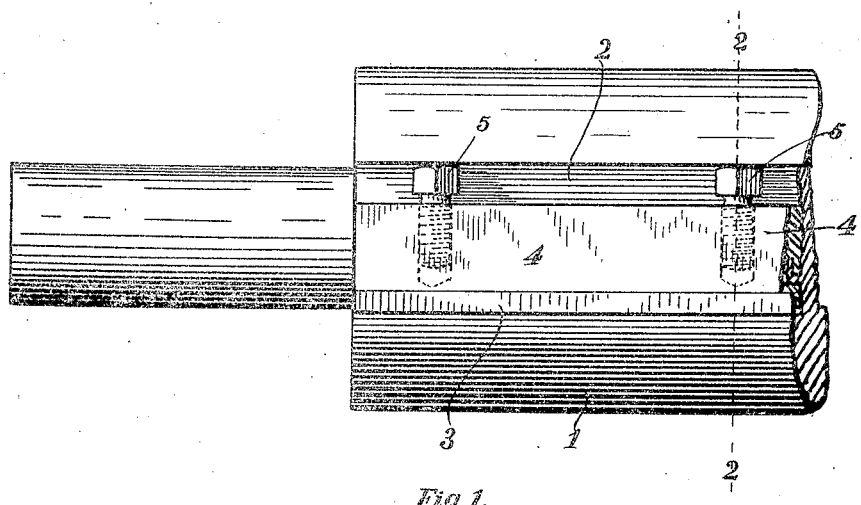
Figure 2:
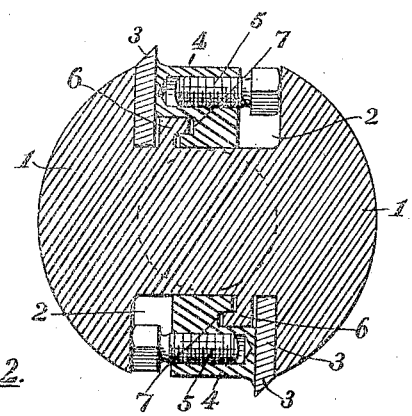
Figure 3:
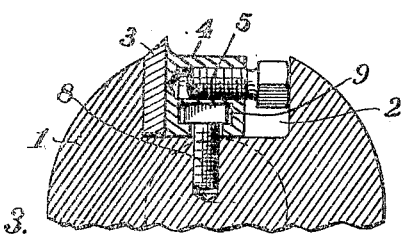

Figure 1 is an elevation of a portion of a planer-cylinder embodying my invention; Fig. 2, a transverse section of the same on the line 2 2 of Fig. 1, and Fig. 3 a detail of a modification of Fig. 2.

Like numbers refer to like parts in all of the figures.

1 represents a rotative cylindrical body of any convenient dimensions, in which are formed longitudinal channels 2, the number of these channels being optional, according to the number of cutters to be used.

3 represents the cutters, which consist of narrow strips of steel without perforations, securely clamped between one wall of the groove 2 and a clamping-bar 4, which latter is forced against the cutter by means of screws 5, inserted in the bar and projecting therefrom with their heads engaging the opposite wall of the groove. The clamping-bar 4 is retained in the channel 2 by interlocking means between the bar and the bottom of the groove, consisting of a rib 6, projecting within the groove 2 and having a lateral tongue which engages a groove 7 in the bar 4, there being sufficient clearance between this tongue and groove to permit of adjusting the bar by means of the screws 5. By forming the interlocking means in the bottom of the groove the cylinder is readily shaped by milling-cutters, and the walls at each side of the groove are stronger to better stand the strain of the screws and centrifugal action. The modification shown in Fig. 3 serves the same purpose, is less expensive, and consists of any convenient number of cap-screws 8 inserted in the bottom of the channel 2 and projecting within the channel, the heads of which screws are inserted in T-slots 9 in the clamping-bar, these slots being provided with sufficient clearance at each side of the cap-screw to permit of adjusting the bar by means of the screws 5. I prefer this modified form as being less expensive and also permitting the clamping member to engage the cutter 3 throughout its entire side adjacent thereto; but either form will operate satisfactorily.

Having thus fully described my invention, what I claim, and desire to secure by Letters Patent, is—

1. The combination of a cylinder having a longitudinal channel, a clamping-bar adjustable in the channel, interlocking means between the bar and the bottom of the channel, a cutter between the bar and one wall of the channel, and screws in the bar with their heads engaging the other wall of the channel.

2. The combination of a cylinder having a longitudinal channel, cap-screws inserted in the bottom of the channel and projecting within the same, a clamping-bar having a T-groove to receive the cap-screws, screws in the clamping-bar and engaging one wall of the channel, and a cutter between the clamping member and the other wall of the channel.

3. The combination of a cylinder having longitudinal channels at opposite sides, said channels having parallel walls, cutters consisting of narrow strips of steel having sharpened edges projecting outside the circumference of the said cylinder and parallel sides engaging one of the walls of the channel and one side of the clamping-bar, a clamping-bar in said channel and provided with a T-slot, cap-screws in the channel and engaging the T-slot, and screws inserted in the clamping-bar, with their heads engaging the other wall of the channel.

In testimony whereof I affix my signature in presence of two witnesses.

ARTHUR W. NELSON.

Witnesses:
LUTHER V. MOULTON,
GEORGIANA CHACE.